March 25, 1947.　　A. W. RUFF　　2,418,097
ENGINE WARMING APPARATUS
Filed Feb. 24, 1943　　4 Sheets-Sheet 1
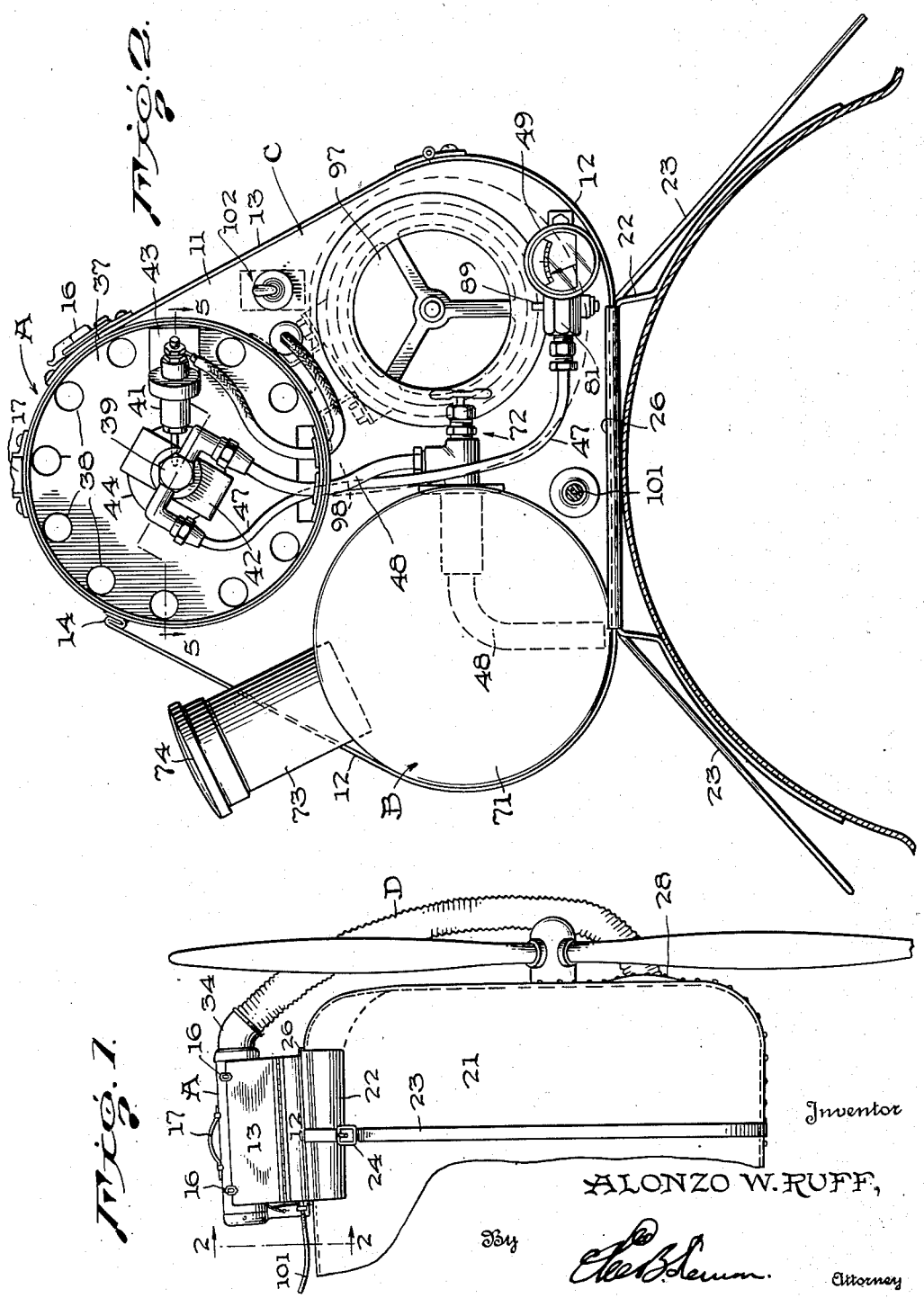
Inventor
ALONZO W. RUFF,
By
Attorney

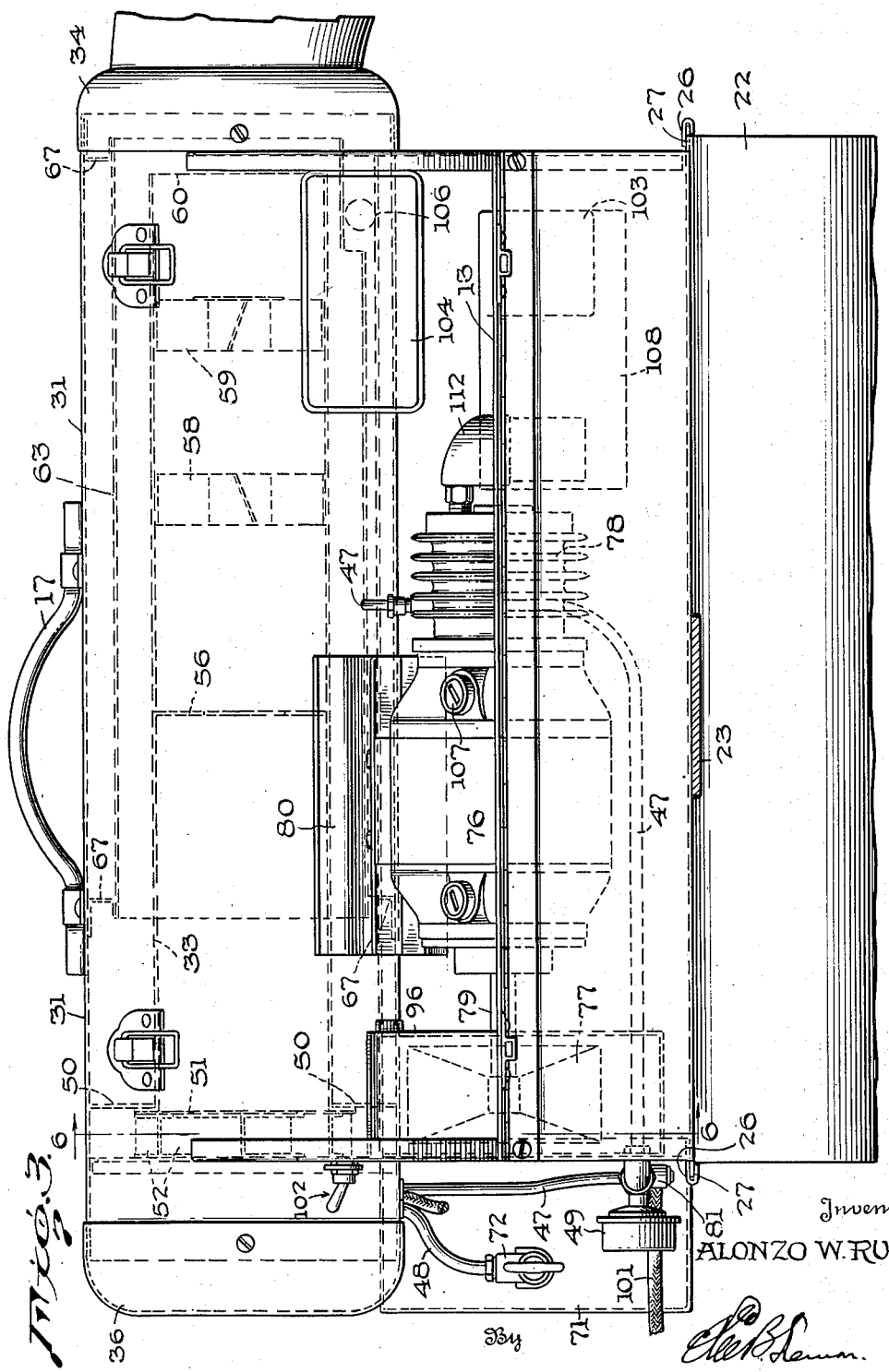

March 25, 1947. A. W. RUFF 2,418,097
ENGINE WARMING APPARATUS
Filed Feb. 24, 1943 4 Sheets-Sheet 3

Inventor
ALONZO W. RUFF,
By
Attorney

March 25, 1947. A. W. RUFF 2,418,097
ENGINE WARMING APPARATUS
Filed Feb. 24, 1943 4 Sheets-Sheet 4
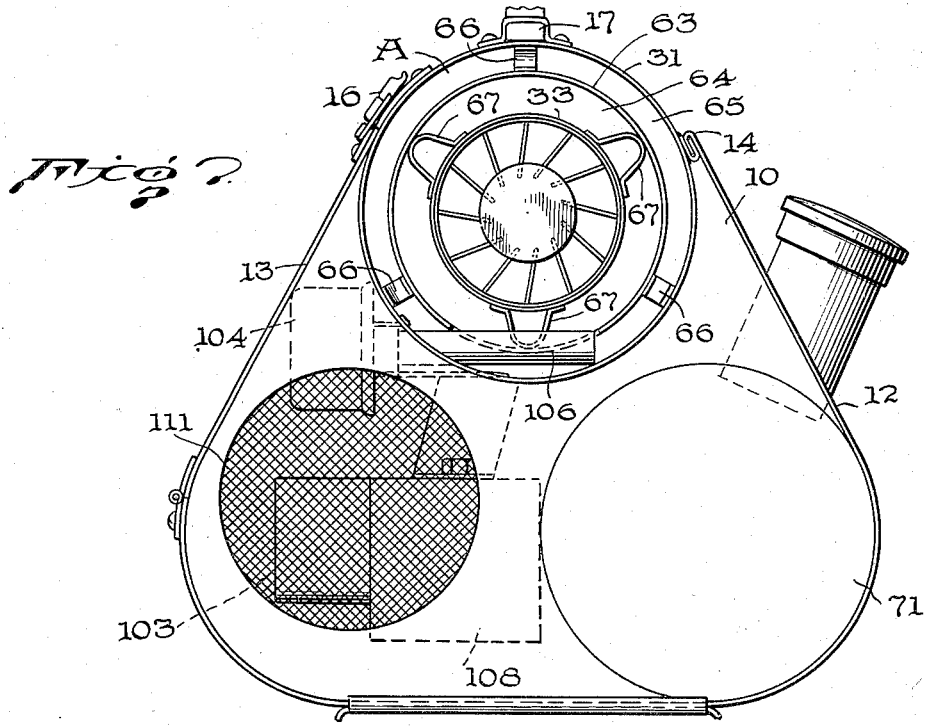
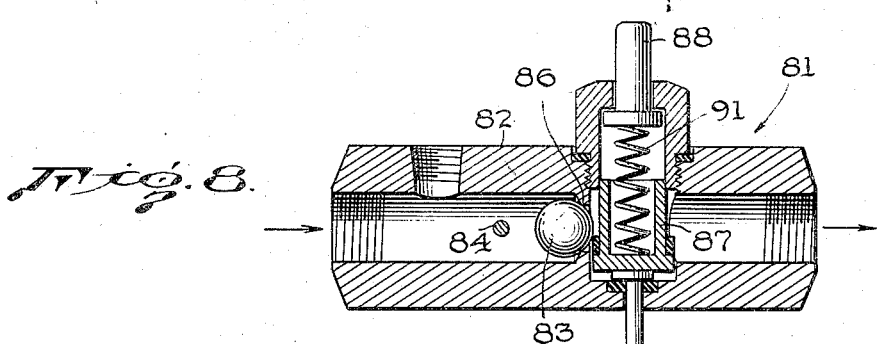
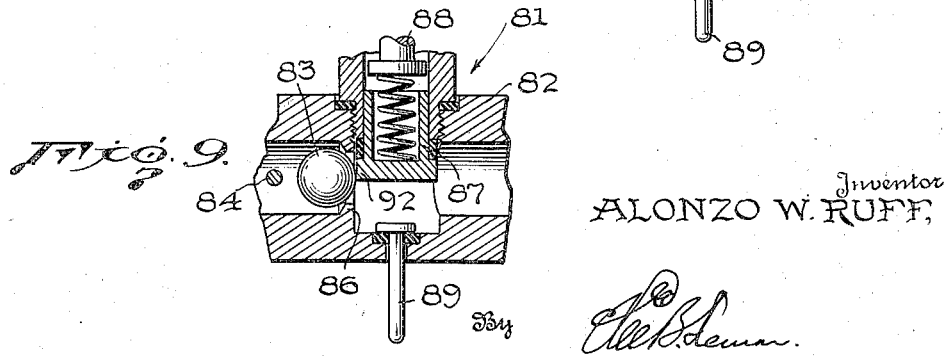
Inventor
ALONZO W. RUFF,
By
Attorney Patented Mar. 25, 1947

2,418,097

UNITED STATES PATENT OFFICE 2,418,097

ENGINE WARMING APPARATUS

Alonzo W. Ruff, York, Pa., assignor to York-Shipley, Inc., York, Pa., a corporation of Delaware Application February 24, 1943, Serial No. 476,974

14 Claims. (Cl. 263—19)

This invention relates to engine warming apparatus, and more particularly to a direct fired heater for warming an airplane engine by discharging a blast of hot gases including products of combustion into the engine housing, cowling, or nacelle. In a preferred embodiment, the heater is adapted for detachable mounting on the engine housing and is connected with the interior thereof by a short length of tubing or pipe.

The art of aeronautics has long been confronted with the problem of starting airplane engines without their being damaged or subjected to excessive wear for want of proper lubrication. This problem is usually presented where airplanes are located in a cold or frigid region or atmosphere. An airplane may not safely begin a flight except as its engine or engines are warm and at a temperature which is efficient for flying operations. Nor may an airplane engine be started while cold without incurring the risk of its being injured for lack of adequate lubrication. It has, however, been a common practice in preparing airplanes for flight to start their engines while cold and to have them operate until their temperature has reached a degree which is efficient and safe for flying. This practice is time consuming, wasteful of engine fuel, and may result in damage to the engines. In a cold engine, lubricant is thick, is slow in circulating to and between surfaces requiring lubrication, and is ineffective to prevent wear of moving parts and surfaces engaged thereby.

Where aircraft are exposed to the elements in an extremely cold environment, region, or atmosphere, it is most difficult, if not impossible, to start their engines for the purpose of warming them for flight.

The present invention solves the described problem of the aircraft art and provides a heater which, in any natural environment, will quickly warm an aircraft engine to an efficient starting and operating temperature. With the use of this heater, an airplane, regardless of ambient temperature or the degree of cold of the surrounding atmosphere, may have its engine heated and be prepared for flight in a remarkably short interval of time. The heater operation is sensitive and responsive to the temperature of the surrounding atmosphere, its firing rate automatically increasing with decreasing ambient temperature. Accordingly, in colder atmospheres the heat output of the heater is greater and satisfies a greater demand. Under warmer atmospheric conditions, the firing rate and heat output are less and overheating of the heater is avoided.

The light weight, compactness, and high heat output of the portable heater make it particularly well adapted for use as regular flying equipment of aircraft. The heater may be conveniently stored in the aircraft fuselage, conveniently carried in one hand by a crew member, and readily mounted on the engine nacelle for use in warming the engine wherever the aircraft may be grounded. As part of the flying equipment of a seaplane, the heater may be used by a crew member in warming the seaplane engine while the seaplane is floating on sea or ocean and without the crew member leaving the seaplane.

It is, therefore, an object of this invention to provide a heater which in a highly efficient operation, is adapted to warm quickly an airplane engine to an efficient starting and operating temperature.

A further object is to provide an efficient, light-weight, compact, portable engine warming heater which may be conveniently, detachably, and quickly mounted on an airplane engine housing, cowling, or nacelle.

Still another object is to provide a relatively small and lightweight portable airplane engine warming heater which is characterized by its high heat output per unit of heater weight. Thus the heater of this invention has remarkable efficiency as regards heat output per unit of heater weight.

A still further object is to provide a portable airplane engine warming heater which is self-contained except for a source of electrical current and which may derive its electrical current from an available source carried by the airplane, the connection between the source and heater being made with a power cable.

Usually the current available on an airplane is direct current. The invention, therefore, has for a further object the provision of means in the portable heater for changing available, low voltage direct current to high voltage current for an electrical spark fuel igniter of the heater.

Still another object is to provide a portable engine warmer with combustion and heating means of novel construction to secure maximum heat energy per unit of fuel consumed in operation of the engine warmer.

A still further object is to provide an aircraft engine warmer having a firing rate responsive to ambient temperature.

Another object is to provide a novel mounting for supporting an engine warmer on an aircraft engine nacelle, cowling or housing.

Other objects and advantages will be apparent from the following description, the appended claims, and the accompanying drawings, wherein Figure 1 is a side elevational view of the front end of an airplane nacelle equipped with a heater of the present invention.

Figure 2 is a rear view on enlarged scale taken on line 2—2 of Figure 1 and with the closure of the burner nozzle compartment removed for purposes of illustration.

Figure 3 is an enlarged elevational view of the heater of Figure 1 with the closure of the motor, fan, and compressor compartment in open position for purposes of illustration.

Figure 7 is a front end view on enlarged scale of the heater of Figure 1, the hose and its coupling member being removed in Figure 7 for purposes of illustration.

Figures 8 and 9 are enlarged detail views in cross-section showing the safety air valve of the heater in two positions of adjustment.

Figures 4, 5, 6:
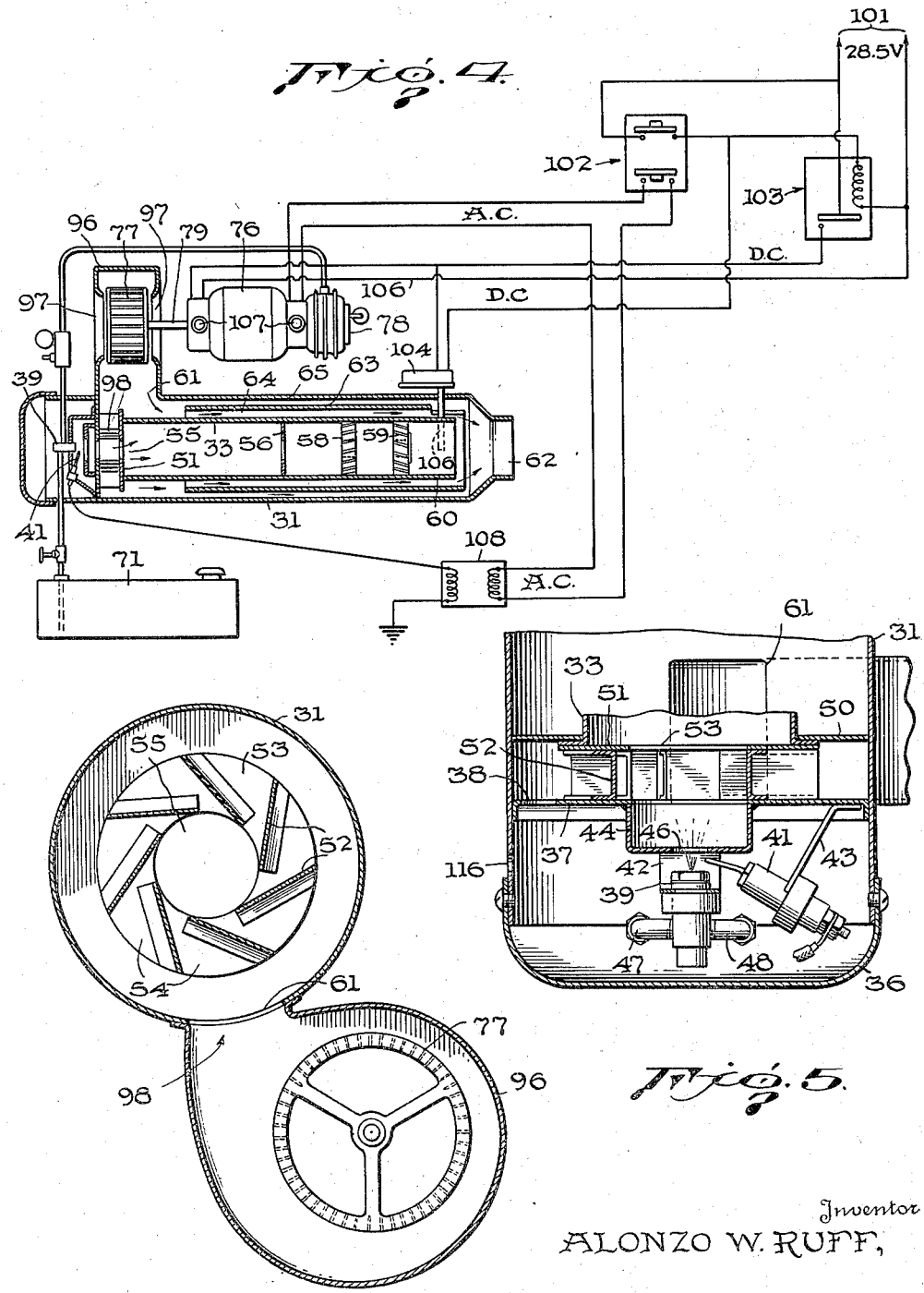
Figure 4 is, in general, a diagrammatic view of the elements of the heater of Figures 1 to 3 and its wiring. For purposes of illustration, the combustion and heating unit of the heater is shown in longitudinal cross-section in Figure 4.
Figure 5 is a detail view in cross-section, being taken on line 5—5 of Figure 2 and showing the nozzle compartment closure.
Figure 6 is a detail view in cross-section and taken on line 6—6 of Figure 3.

Referring now to the drawings, the heater of this invention comprises a compact arrangement of an air warming and combustion assembly or unit A, a fuel tank unit B, a motor, fan and compressor assembly or unit C for supplying air to the unit A, pipe and electrical connections for the units A, B and C, and a hose or pipe D through which the hot gases of the unit A pass for introduction into the nacelle or engine housing of an airplane.

The heater has a housing including front and rear wall members 10 and 11 (Figures 7 and 2). The side walls and bottom of the housing are formed by a sheet-like member 12 and a closure 13. The member 12 is secured at its longitudinal edge 14 in any suitable manner to the adjacent side wall of the combustion and heating assembly A (see Figures 2 and 7). The closure 13 is secured by means of hinges to the other longitudinal edge of the member 12 and is retained in closed position by latching devices 16 which are mounted on the side of the combustion unit A. When the closure 13 is in open position (Figure 3), the interior of a motor, fan, and compressor compartment is conveniently accessible.

The heater is of such weight and size that it may be conveniently carried by an individual. A handle 17 in the form of a strap secured to the top wall of the combustion unit A permits the heater to be carried in the hand in substantially the same manner as a traveling bag.

As shown in Figure 1, the heater of this invention may be readily mounted on the housing or nacelle 21 of an airplane engine by means of a saddle or support 22 and a strap or belt 23 having a conventional buckle 24. The saddle 22 is shaped to fit the engaged part of the engine housing 21 and has inwardly facing flanges 26 at its forward and rearward edges to form guideways. The saddle 22 is held firmly in place by the strap 23 which extends over the saddle 22 and completely encircles the engine housing 21. The base of the heater has forward and rearward flanges 27 which interfit with the saddle flanges 26 and the guideways formed thereby (see Figure 3). The saddle 22 having been secured to the engine housing 21, the heater is mounted in place on the saddle 22 by a side-wise movement with the heater flanges 27 sliding in and retained by the saddle guideways. The discharge end of the hose D is then positioned to direct the hot gases of the heater into the interior of the engine housing 21 (Figure 1) for warming the engine therein when the heater is operating. The entrance of cold air into the open front end of the engine housing 21 is prevented, during the prewarming operation, by a removable shield 28 of any suitable form, such, e. g. as a heavy canvas covering.

Combustion and heating unit

The combustion and heating assembly or unit A is fed with fuel from the fuel tank unit B and with air from the motor, fan and compressor unit C. The air supplied by the unit C to the unit A performs a number of functions. It provides primary air for the unit A, draws the fuel from the unit C by suction, and sprays the fuel into the unit A where the fuel is burned. It also provides secondary air to the fuel burning in unit A. It, furthermore, supplies air for absorbing heat lost in the unit A by the products of combustion. All the gases in the unit A, that is the products of combustion and the air heated thereby, are discharged into the hose D and serve to warm the airplane engine.

The combustion and heating unit A includes a tubular member 31 which serves as both an air duct and as a housing for a fuel burner 39 and a firing tube 33. For convenience, the member 31 will hereinafter be referred to as a duct or an air duct. The front end of the duct 31 is provided with a removable fitting or coupling 34 for connection with the hose D (see Figure 3). The rear end of the duct 31 houses the burner 39 and is provided with a removable closure 36, as shown in Figures 3 and 5. For the purpose of illustration, the heater is shown in Figure 2 with the closure 36 removed and in Figure 7 with the fitting 34 removed.

A partition or wall member 37 separates the burner compartment from the remainder of the duct 31 and is provided with an annular series of pressure equalizing openings 38 (see Figures 2 and 5).

The burner compartment (see Figures 2 and 5) contains the aspirating fuel burner nozzle 39 and a fuel igniting spark electrode 41. The nozzle 39 and the electrode 41 are carried by brackets 42 and 43 respectively which are mounted on the partition 37. The partition 37 also has a central opening at which a fitting 44 is mounted. This fitting 44 has an aperture 46 aligned with the nozzle 39.

Air under pressure is fed by a pipe 47 to the aspirating nozzle 39. This primary air draws fuel into the nozzle 39 from a pipe 48 by suction (Figure 5), the air and fuel issuing from the nozzle 39 as a fluid spray. This spray is ignited by an electric arc or spark which is formed between the tip of the spark electrode 41 and the fitting 44. The ignited spray is directed through the aperture 46, the fitting 44 and the central opening of the partition 37. The ignited fuel and air mixture or spray then passes through an opening 55 defined by an annular air register and into the fire or combustion tube 33.

The air register provides secondary air, which is so introduced into the spray from the nozzle 39 as to be thoroughly mixed therewith and to impart a whirl to the ignited fuel spray. This air register (Figures 4, 5 and 6) is formed by an annular partition member 50, a centrally apertured wall member 51, the centrally apertured partition 37 and an annular series of stationary vanes 52. The annular partition member 50 encircles the firing tube 33 and is secured to the inner end flange thereof. The wall member 51 is spaced from the partition 37 by the vanes 52 and has a central opening 53 (Figure 5) which is of the same size, and aligned with, the central opening in the partition 37. Air flows into the air register at the periphery thereof, and along passages 54 which are formed by the wall member 51, the vanes 52 and the partition 37. The air register passages 54 discharge the secondary air into the space or opening 55 having its limits defined by the inner edges of the vanes 52. This secondary air discharge is substantially tangential to the fuel spray from the burner nozzle 39. Thus the secondary air is discharged with a whirl imparted thereto which surrounds the path of the nozzle spray. This whirling secondary air supply issuing from a series of passages completely encircles the fuel spray and its whirl component is imparted to the fuel spray. The force of the fuel spray and the secondary air from the passages 54 is effective to produce continuous discharge of whirling gases through the space or register opening 55 into the fire or combustion tube 33.

The firing tube 33 is constructed to promote complete combustion therein and also to confine the flame of the burning fuel. Intermediate its ends the firing tube 33 is provided with a baffle 56 (Figures 3 and 4). This baffle 56, which may be in the form of a ring or a centrally apertured plate, retards the flow of gases to such extent that combustion is primarily in the fire tube space between the wall member 51 and the baffle 56. The burning gases and air pass the baffle 56 by flowing through its centrally arranged aperture or opening. The firing tube 33 is also provided with two spaced sets (58 and 59) of vanes between its discharge end and the baffle 56. These vane sets 58 and 59 serve as gas mixing baffles to produce turbulence in the gases passing therethrough. This turbulence brings unburned air into more intimate relation with burning fuel to thereby complete combustion within the firing tube 33 and avoid the possibility of any flame passing through the discharge end 60 of the firing tube. In a preferred form, the vanes of each set 58 and 59 are arranged in an annular series with the vanes of one set having a pitch opposite to the pitch of the other set. The first vane set 58, therefore, will effect a whirling action in one direction of the gases flowing therethrough, and the second vane set 59 will impart to the gases flowing therethrough a whirling action in the opposite or reverse direction. The retarding effect of the baffle 56 and the whirling effect of the vane sets 58 and 59 result in the fuel being substantially completely burned before the gases or products of combustion are discharged from the firing tube 33.

The firing tube 33 is insulated from the atmosphere by an envelope of air which flows in the space between the fire tube 33 and the housing or duct 31. Air is supplied to the duct 31 through the opening 61, a portion of which is opposite the described air register. Part of this air flowing through the duct opening 61 travels in an annular path defined by the duct 31, the partition members 37 and 51, and the end edges of the air vanes 52 and through the series of air register passages 54, as previously described, to provide secondary air for the firing tube 33. A limited volume of air travels through the openings 38 to equalize the pressures at opposite sides of the partition 37. The remainder of the air from duct opening 61 flows through the annular space between the duct 31 and the firing tube 33 and then through the discharge opening 62 (Figure 4) of the duct 31. This flowing air in the duct 31 absorbs heat that is conducted through the walls of the firing tube 33, and moves quickly to the duct discharge 62 with the result that little, if any, heat is lost by conduction through the walls of the duct 31 to the atmosphere. Loss of heat to the atmosphere is further avoided by means of a heat shield 63 in the form of a tube or sleeve. The heat shield 63 extends from adjacent the duct opening 61 to adjacent the discharge end of the firing tube 33. The shield 63, the duct 31, and the firing tube 33 are concentrically arranged in spaced relation to provide inner and outer annular air passages 64 and 65 respectively. The air flowing in passage 64 absorbs a major part of the heat passing through the walls of the firing tube 33. The air flowing in passage 65 acts as an insulating medium and is effective to maintain the duct 31 in a relatively cool condition. The products of combustion flowing from the discharge end of the firing tube 33 mix with the warmed or hot air flowing from the annular passages 64 and 65 as shown in Figure 4. This hot gaseous mixture of warmed air and products of combustion flows through the hose D and into the engine housing or nacelle 21.

The duct 31, the firing tube 33, and the heat shield or sleeve 63 are secured in assembled relation by means of brackets or spacers 66 and 67 (see Figures 3 and 7).

The hose D is flexible and also axially collapsible. The collapsible feature permits the hose D to be compactly arranged for storage when not in use. During storage of the heater, the hose D may be detached by removal of the fitting 34 from the duct 31. The hose D is preferably formed by a flexible asbestos tube supported internally by a plurality of spaced rings or by a coiled wire or spring. The hose D insulates the gases flowing therein from the atmosphere and thereby minimizes heat loss. Waste of heat is further avoided by mounting the heater on the engine housing and in close proximity to the point of discharge into the engine housing interior. Thus the blast of hot gases from the heater has a relatively short path of travel before reaching the engine to be warmed.

*Fuel tank unit*

The portable engine warmer or heater includes a tank 71 (Figures 2 and 7) for holding a supply of fuel, which preferably is gasoline. The tank 71 is arranged at a lower level than the fuel nozzle 39 and is connected thereto by the fuel supply pipe line 48, which is fitted with a manually controlled valve 72 for cutting off the fuel supply to the nozzle 39 when such is desired. The valve fitting 72 preferably includes a strainer or filter (not shown) in the fuel line in order to prevent passage of any solid matter or sediment to the burner nozzle. Fuel may be supplied to the tank 71 through a fill pipe 73 having a closure or cap 74. The fuel tank 71 preferably is of circular cross-sectional shape of a length and diameter corresponding to that of the duct 31. As the fuel tank 71 is located at the bottom of the heater, it is positioned in the coolest region for preventing fire or explosion. The fuel tank 71 is also maintained at a cool temperature by atmospheric air flowing into the heater in a manner to be described.

The compactness of the heater is, in part, secured by providing the tank 71 and the heating and combustion unit A in close, parallel relation with the tank 71 corresponding in shape and size to the unit A.

Motor, fan and compressor unit

The heater has an electric motor 76 driving both an air fan 77 and an air compressor 78, which are operated directly by the motor shaft 79 (see Figures 3 and 4). The shell or casing of the air compressor 78 is supported by the housing of the motor 76, which is secured to the duct 31 by means of a bracket or angle iron 80.

The discharge of the air compressor 78 is fed by the pipeline 47 to the burner nozzle 39 for aspirating fuel from the tank 71 and blowing it out of the nozzle 39. The air pipeline 47 may be provided with a pressure gauge 49 which is conveniently positioned to be read from without the heater.

The air pipeline 47 is also preferably provided with an air safety valve 81 (Figures 2, 8 and 9). The air safety valve 81 comprises a tubular body 82 having a movable ball 83 positioned between a retainer pin 84 and a seat or flange 86. A piston 87 is fitted in the valve body 81 to be moved transversely of the axis of the ball seat 86. The piston 87 is operable by means of two pins 88 and 89. The pin 88 is operable to force the piston 87 inwardly to an extreme position, which frees the ball 83 for engagement with the seat 86 to stop the flow of air through the body 82. A compression spring 91, which is interposed between the pin 88 and the piston 87, yieldingly maintains the piston 87 in its projected or ball releasing position (Figure 8). In starting the heater, the pin 89 is pressed inwardly to move the piston 87 to ball unseating position (Figure 9), in which the piston flange 92 engages the ball 83 and holds it out of engagement with the seat 86. Air under pressure now may flow through the body 82 and will act to hold the piston 87 in its ball releasing position (Figure 9). When the air pressure fails or falls below a predetermined amount, the piston 87 moves, under the action of the spring 91, to release the ball 83 for engagement with the seat 86 (Figure 8) in a valve closing operation. Thus the feeding of fuel is discontinued by an automatic closing operation of the air valve 81 when the air pressure or the compressor 78 fails.

The fan 77 (Figures 2, 3, 4 and 6) is positioned within a housing 96 having oppositely arranged air intake openings 97 (Figure 4). The air is discharged from the fan housing 96 through an outlet opening 98, and the duct opening 61 (Figures 2 and 6). The air passing through the duct opening 61 flows along two separate paths in the duct 31 as previously described. One path is through the air register and the firing tube 33. The other path is between the firing tube 33 and the duct 31.

Current supply and control

The electrical current for operating the heater is provided by a power cable 101 which is adapted for detachable connection with an available source (not shown), such as a battery or generator, within the airplane fuselage. The heater is wired and electrically controlled as diagrammatically illustrated in Figure 4. The heater controls include a starting switch 102, a safety overload switch or aviation relay 103, and a thermostatic device or automatic limit switch 104. The switch 102 is manually controlled for starting the motor 76. This switch 102 may be of the type which is closed by the operator and released by the operator when the unit has established normal operation and the limit switch has taken its operating position. The thermostatic device 104 has a temperature responsive element 106 extending into the air stream of the duct 31 as shown in Figures 3, 4 and 7. This thermostatic device 104, operating through the relay 103, opens the motor circuit when the air stream of the duct 31 reaches a predetermined maximum temperature, or a predetermined minimum temperature. Thus, overheating is prevented, and at the same time, the thermostatic device 104 will open the motor circuit, after operation of the burner has been initiated, in event of subsequent failure of fuel, flame, or combustion.

The motor 76 is supplied with D. C. current by the wiring 106 (see Figure 4) and as illustrated is provided with a slip ring and brush assembly 107 to supply A. C. current for the burner spark electrode 41. A transformer 108 provides the desired voltage for the spark electrode 41. Alternatively an interrupted or pulsating uni-directional current may be used for ignition purposes. In this case, a rotary make and break switch on the motor shaft may be used, by which the D. C. supply current from which the motor is operated, to furnish pulsating current to a suitable spark coil (not shown) in lieu of the transformer 108. As shown in the drawing the ignition circuit is closed, at starting, by closing the switch 102, and it is intended that the supply of ignition current will be interrupted (cut-off) when normal operation of the burner has been established, at which time the switch 102 is permitted to move to its open circuit position.

The starting switch 102 is mounted on the rear end wall 11 (Figure 2). The overload relay 103, the thermostatic switch 104, and the transformer 108 are mounted within one end of the motor, fan and compressor compartment as shown in Figures 3 and 7, and are easily accessible for inspection or repair when the closure 13 is opened. During operation of the motor 76, the fan 77 creates a draft of air through the interior of the heater. The air is drawn into the heater through the front wall opening, which is provided with a screen 111 (Figure 7). Air passing through this screen 111 sweeps the exposed surfaces of the overload relay 103, the limit switch 104, the transformer 108, the fuel tank 71, the duct 31, the compressor 78, and the motor 76. Thus the air absorbs heat from warmed surfaces. The air thereby maintains the contacted heater parts at a cool temperature for efficient operation. The air also minimizes heat loss from the duct 31, and at the same time maintains the fuel tank 71 at a cool temperature to avoid any possibility of fire or explosion due to overheating of the fuel tank 71. Air drawn through the front wall screen 111 travels to the other end of the heater where the air enters the fan casing 96 for discharge into the duct 31. The compressor 78 also draws its air supply from the air flowing through the front wall screen 111. Lubrication for the compressor 78 is supplied from a reservoir 112 (Figure 3).

Operation

The heater is mounted in the following manner for warming an airplane engine. The saddle 22 and the strap 23 are secured in position (Figure 1) on the engine housing, cowling, or nacelle 21. The front of the engine housing 21 is covered with a shield or hood 28. The heater is mounted (Figure 1) in the saddle 22 and has the discharge end of its hose D positioned to extend through a suitable opening in the hood 28. The power cable 101 of the heater is connected to the source of current (D. C.) on the airplane.

The heater operation is initiated by opening the fuel supply valve 72, closing the motor starting switch 102, and operating the air valve pin 89 to open the air safety valve 81. Actuation of the switch 102 closes the motor circuit to start the motor 76, which latter by generator action provides current for the fuel igniter electrode 41 and also drives the air compressor 78 and the air fan 77. The fuel igniting spark from the electrode 41 may be checked and inspected at this time by viewing the same through a peep hole 116 (Figure 5) in the top wall of the duct 31. The pressure of the air supplied by the compressor 78 may be checked by inspection of the gauge 79 (Figure 2).

Air from the compressor 78 flows through the pipeline 47 to the aspirating burner nozzle 39 and draws fuel through the pipeline 48 from the fuel tank 71. This air also mixes with the fuel in the nozzle 39 and produces a nozzle discharge in the form of a gaseous spray of fuel and primary air for combustion. This spray is ignited by the spark from the electrode 41 and is directed through the air register space 55 into the firing tube 33.

Air from the fan 77 is discharged through the outlet 98 into the duct 31 to provide secondary air for the air register passages 54 and also an air stream through the space between the firing tube 33 and the duct 31. The secondary air is discharged by the air register passages 54 into the air register space 55 where the secondary air mixes with and imparts its whirl to the ignited spray from the burner nozzle 39. The resulting whirling gaseous mixture flows into the interior or combustion space of the firing tube 33. Combustion of the burning gases issuing from the air register space 55 is completed in the firing tube 33 where it is confined with the aid of the baffle 56 and the vane sets 58 and 59. The baffle 56 retards the movement of the burning gases along the firing tube 33. The gases pass the baffle 56 by passing through its central opening. The vane sets 58 and 59 are effective to impart to the burning gases successive whirling movements in two opposite directions and thereby so mix the gases passing therethrough that combustion is completed before they leave the firing tube 33.

Part of the air from the fan 77, as previously noted, flows through the space between the firing tube 33 and the duct 31 including the passages 64 and 65 (Figure 4). This air insulates the firing tube 33 from the atmosphere and also is warmed by heat passing through the firing tube walls. The warmed air from the passages 64 and 65 is discharged into the duct outlet 62 and at the same time is mixed with the products of combustion flowing through the outlet of the firing tube 33. This mixture of hot gases flows through the hose D into the engine housing 21 and, in a remarkably short interval of time, warms the engine therein to a desired starting temperature.

In the event the temperature of the air stream surrounding the outer end of the firing tube 33 drops below a predetermined minimum temperature or rises above a predetermined maximum temperature, the thermostatic device 104 interrupts the motor circuit and operation of the heater is discontinued. Thus operation of the heater is stopped if the fuel or flame fails, or if the air stream at the outside of the firing tube 33 reaches too high a temperature.

As soon as the motor 76 stops running, the compressor 78 stops operating, and the pressure in the air pipeline 47 fails. The safety valve 81 (Figures 8 and 9) then automatically closes the air pipeline 47.

Atmospheric air enters the heater through the front wall opening having the screen 111 and flows through the interior of the heater over the motor and compressor, to the intake of the compressor 78, and to the inner intake 97 of the fan housing 96. This air flow also cools the fuel tank 71, the transformer 108, the overload relay 103, the switch of the thermostatic device 104, the compressor 78, and the motor 76. This air flow also minimizes heat loss from the duct 31 to the atmosphere. The fan 77 draws air directly from the atmosphere through the fan housing intake opening 97 shown in Figure 2 and also air from the motor, fan, and compressor compartment through the other fan housing intake opening 97.

An important characteristic of the heater is its sensitiveness and responsiveness to environment and atmospheric conditions. The heater may thus be used in various climates or under varying ambient temperature conditions with equal success. It is found that the firing rate of the heater and hence its capacity to supply heat increases with lowering of the ambient temperature or of the temperature of the surrounding atmosphere. In other words, the firing rate varies inversely with the ambient temperature. Increased demand on the heater due to an extremely low temperature is met automatically by an increased firing rate. On the other hand, the danger of overheating is avoided since the firing rate is lower when the heater is used, for example, in a moderately cold climate. This variation in firing rate with change in ambient temperature is believed to be the result of the use of gasoline as fuel and the use of suction in lifting the fuel from the tank 71 and feeding it to the nozzle 39 by means of air from a compressor or the like. Since density of the air varies inversely with its temperature, the colder the air, the greater its density and inertia effect. With increase in the density and inertia of the air, increased fuel pumping action by the compressed denser air, as well as increased air supplied by the blower, is secured. The tendency of the gasoline to vaporize varies inversely with its temperature. As the temperature of the gasoline is lowered, its tendency to form vapor in the nozzle head decreases with the result that flow of the gasoline through the nozzle is correspondingly increased.

The increase in flow of gasoline, due to lowered temperature condition, is also attributable in part to the fact that the density of the gasoline increases somewhat with lowering temperature.

Other important features of the present heater are its high heat output per unit weight, and its efficiency in avoiding heat losses to the atmosphere. A large proportion of the heat of combustion is carried by the products of combustion to the point of use, namely the interior of the engine housing 21. Substantially all of the heat lost by the products of combustion is absorbed by the air stream from the fan 77, this air stream being mixed with the products of combustion before introduction into the engine housing 21. The air passing through the interior of the heater to the fan 77 also absorbs any friction heat generated by the mechanical, operating parts of the heater. Accordingly, the heater may have its useful heat output somewhat in excess of the heat produced by combustion.

The light weight and compactness of the heater contribute to its usefulness. It may be easily carried in the hand and may be conveniently stored in an airplane as part of its regular flight equipment. The heater is especially useful with seaplanes which cruise or fly over the seas and oceans and frequently land on the water far from shore and the equipment which is usually found at shore bases.

The foregoing is to be understood as illustrative, since this invention includes all embodiments and modifications coming within the scope of the appended claims.

I claim:

1. A compact and portable aircraft engine heater comprising a casing having an air inlet, a motor and fan unit in said casing, an air warmer and combustion unit having outer wall surface exposed to the interior of said casing, a fuel tank having outer wall surface exposed to the interior of said casing, a fuel burner for said air warmer and combustion unit, said fuel burner being supplied with fuel from said tank, said fan drawing air from said casing inlet to produce air circulation through said casing interior and discharging the air into said air warmer and combustion unit, and a pipe for receiving the discharge of heated air and products of combustion from said air warmer and combustion unit and introducing the discharge into an aircraft engine nacelle.

2. A compact and portable aircraft engine heater comprising a tubular fuel tank adjacent the base of the heater, a motor, fan, and compressor unit extending parallel to and at one side of said tank, an elevated tubular air warmer and combustion unit extending parallel to said tank, and adapted to be supplied with air from said fan, a burner for said unit and adapted to be supplied with fuel in said tank by aspirating air from said compressor, means forming with said tank and said air warmer and combustion unit a protective enclosure for said motor, fan, and combustion unit, and an outlet pipe for warmed air and products of combustion discharged by said air warmer and combustion unit.

3. A heater as recited in claim 2, wherein the pipe is connected to the air warmer and combustion unit at one end of the heater, and the burner is positioned at the other or rear end of the heater, and controls for the motor, the fuel supply to the burner, and the supply of aspirating air to the burner which are mounted at said rear heater end.

4. A portable, self-contained, outdoor heater for supplying hot gases to an aircraft engine nacelle to warm the engine in preparation for its starting, the said heater comprising a combustion unit, a fuel burner nozzle and an electric sparking device positioned to ignite the fuel mixture issuing from said nozzle, a fuel tank communicating with said nozzle, a compressor for supplying compressed air and fuel from said tank to said nozzle, an electric motor for driving said compressor, means deriving its energy from operation of said motor for supplying ignition current to said sparking device, and means for conducting the heated gases from said combustion unit for introduction into the engine nacelle.

5. In a portable heater unit for preheating the engine of an airplane preparatory to its starting, the combination comprising: a housing having side and end walls with an air inlet, and an outlet for the discharge of heated air and products of combustion, a combustion chamber mounted within said housing and spaced therefrom to provide for air circulation to wipe the outer wall surface of said chamber, a fan for supplying a current of air through said housing from said inlet and along the outer wall surface of said chamber, means for diverting a part of the circulated air into the said combustion chamber to support combustion therein, an atomizing burner nozzle for discharging a mixture of air and fuel into said combustion chamber, a fuel tank within the housing for supplying fuel to the burner, an air compressor also within the housing for supplying air under atomizing pressure to said burner, a motor for operating the said fan and compressor, and means for conducting heated air and the products of combustion from the outlet of said housing to the nacelle of an engine to be heated.

6. A portable heater unit as recited in claim 5, wherein the air diverting means is an air register in the form of an annular series of passages arranged substantially tangentially to the outlet opening into the combustion chamber, the said passages communicating at their outer ends with the housing air inlet and at their inner ends with the combustion chamber.

7. A portable heater unit as recited in claim 5 wherein the housing and the combustion chamber are concentrically arranged tubular members, and a heat shielding sleeve surrounds the inner tubular member or combustion chamber and is spaced from both of said tubular members to provide concentric annular passages for air flowing from the housing air inlet to the housing outlet.

8. A portable engine heater unit as recited in claim 5, wherein the combustion chamber is a tubular member having a baffle intermediate the ends thereof for retarding the flow of burning gases through the chamber and having means adjacent the discharge end thereof for imparting whirling movements to the hot gases flowing in said chamber to said discharge end, the said baffle and last named means serving to prevent flame travel beyond the confines of the combustion chamber.

9. A compact, portable aircraft engine heater for preheating the engine preparatory to its starting, the combination comprising; a fuel tank adjacent the base of the heater, a driven shaft extending parallel to said tank and motor means for driving the shaft, a fan and compressor mounted on said shaft and driven thereby, an air warmer and combustion unit elevated above said fuel tank and adapted to be supplied with air from said fan, an atomizing burner for said unit operated by compressed air supplied by said compressor, means for supplying fuel from said tank to said burner, and means for conducting warmed air and products of combustion from said unit into an aircraft engine nacelle.

10. A compact, portable engine heater for preheating the engine preparatory to its starting, the combination comprising; a fuel tank, a driven shaft, a fan and compressor mounted on said shaft and driven thereby, an air warmer and combustion unit adapted to be supplied with air from said fan, a burner for said combustion unit adapted to be supplied with fuel from said tank by pressure of air from said compressor, means for conducting warmed air products of combustion from said unit into an aircraft engine nacelle, a housing for enclosing said fuel tank, fan, compressor and combustion unit to contitute a rigid unitary assembly, and means comprising interfitting parts for detachably supporting the heater upon the exterior of the cowling of the engine to be heated.

11. A compact and portable engine heater comprising; a casing having end, bottom and side walls, a fuel tank adjacent said bottom wall, a motor, fan, and compressor unit extending parallel to and at one side of said tank, a tubular air warmer and combustion unit elevated above said fuel tank and adapted to be supplied with air from said fan, a burner for said unit adapted to be supplied with fuel from said tank by aspirating air furnished by the compressor, an outlet pipe for discharging warmed air products of combustion into an aircraft engine nacelle, and means carried by the casing for detachably securing said heater to the engine cowling.

12. In a compact and portable engine heater for preheating the engine preparatory to its starting and adapted to be detachably connected to the engine cowling, the combination comprising; a housing having an air inlet and outlet, a fuel tank in said housing, a fan and compressor unit extending along one side of said tank, an air warmer and combustion unit in said housing adapted to be supplied with air from said fan, a burner for said combustion unit adapted to be supplied with fuel from said tank by air pressure supplied by said compressor, said air warmer and combustion unit including a tubular member having an air register in communication with the air inlet, a baffle spaced from said register for retarding the flow of burning gases discharged therefrom, means adjacent the discharge end of said combustion unit for imparting successive whirling movements in opposite directions to the gases flowing in said tubular member toward the outlet of said casing, a motor to drive said fan and compressor, and a pipe for conducting warmed air and products of combustion discharged by said air warmer and combustion unit to the engine nacelle.

13. For use in warming an airplane engine to starting temperature, the combination comprising; a portable, self-contained combustion-type heater, a hose for conducting hot gases from said heater to the interior of the engine cowling, a saddle adapted to be mounted on the engine cowling to support said heater exteriorly of said cowling, guideways on said saddle interfitting with flanges on said heater to provide for mounting and removal of said heater in a sliding operation, and means for securing detachably said saddle to the engine cowling.

14. For use in warming an airplane engine to starting temperature, the combination comprising; a portable, self-contained combustion-type heater, a hose for conducting hot gases from said heater to the interior of the engine cowling, a saddle adapted to be mounted on the engine cowling to support said heater exteriorly of said cowling, and a strap-like member adapted to substantially encircle the engine cowling to secure the saddle in position on the cowling.

ALONZO W. RUFF.

REFERENCES CITED

The following references are of record in the file of this patent:

UNITED STATES PATENTS

| Number | Name | Date |
| --- | --- | --- |
| 1,629,921 | Mansfield | May 24, 1927 |
| 1,677,197 | Myers | July 17, 1928 |
| 2,097,255 | Saha | Oct. 26, 1937 |
| 2,000,733 | Avery | May 7, 1935 |
| 1,423,742 | Silverman | July 25, 1922 |
| 781,308 | Smith | Jan. 31, 1905 |
| 2,066,524 | Gehmich | Jan. 5, 1937 |
| 2,295,177 | King | Sept. 8, 1942 |
| 1,862,114 | Gilly | June 7, 1932 |
| 508,689 | Engelman | Nov. 14, 1893 |
| 1,943,053 | Boisset | Jan. 9, 1934 |
| 2,015,982 | Witzel | Oct. 1, 1935 |
| 2,196,828 | Hess | Apr. 9, 1940 |